(12) United States Patent
Howard

(10) Patent No.: US 11,740,319 B2
(45) Date of Patent: *Aug. 29, 2023

(54) SYSTEM AND METHODS FOR DETECTING A POSITION USING DIFFERENTIAL ATTENUATION

(71) Applicant: Michael L. Howard, Federal Way, WA (US)

(72) Inventor: Michael L. Howard, Federal Way, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/558,164

(22) Filed: Dec. 21, 2021

(65) Prior Publication Data
US 2022/0113369 A1 Apr. 14, 2022

Related U.S. Application Data

(63) Continuation of application No. 16/707,987, filed on Dec. 9, 2019, now Pat. No. 11,221,391, which is a continuation of application No. 15/082,688, filed on Mar. 28, 2016, now Pat. No. 10,539,649.

(51) Int. Cl.
| | | |
|---|---|---|
| *G01S 3/02* | (2006.01) | |
| *G01S 5/04* | (2006.01) | |
| *H01Q 21/24* | (2006.01) | |
| *H04L 101/622* | (2022.01) | |

(52) U.S. Cl.
CPC .............. *G01S 5/04* (2013.01); *H01Q 21/24* (2013.01); *H04L 2101/622* (2022.05)

(58) Field of Classification Search
CPC ........ G01S 5/00; G01S 5/0252; G01S 5/0215; G01S 5/04; G01S 19/22; H01Q 21/24; H01Q 21/245; H04B 7/10; H04L 61/6022

USPC ................... 342/463, 451, 357.61
See application file for complete search history.

(56) References Cited

U.S. PATENT DOCUMENTS

| | | |
|---|---|---|
| 5,223,816 A | 6/1993 | Levinson et al. |
| 5,532,705 A | 7/1996 | Hama |
| 5,548,837 A | 8/1996 | Hess et al. |
| 6,987,489 B2 | 1/2006 | Melconian et al. |
| 7,127,222 B2 | 10/2006 | Kim et al. |
| 7,212,828 B2 | 5/2007 | Hind et al. |

(Continued)

FOREIGN PATENT DOCUMENTS

WO 2001095642 A2 12/2001

OTHER PUBLICATIONS

Arthaber et al., "Ranging and Positioning of UHF RFID Tags" Technische Universitat Wien, TU Graz, Austria Feb. 22, 2016.

(Continued)

*Primary Examiner* — Chuong P Nguyen
(74) *Attorney, Agent, or Firm* — Austin Rapp

(57) ABSTRACT

An apparatus for indicating a direction of a radio transmission is described. The apparatus includes at least one vector detection device including two or more antennas and an attenuating material between at least one of the antennas and a source of a radio transmission. The attenuating material is arranged to vary an amount of attenuation with an angle of the source with respect to at least one of the antennas. The apparatus is configured to generate a signal indicating a direction of the radio transmission by comparing received signal strengths from the two or more antennas.

18 Claims, 13 Drawing Sheets

(56) References Cited

U.S. PATENT DOCUMENTS

| | | | |
|---|---|---|---|
| 7,260,408 | B2 | 8/2007 | Friday et al. |
| 7,349,701 | B2 | 3/2008 | Lastinger et al. |
| 7,522,918 | B2 | 4/2009 | Wachter et al. |
| 7,616,959 | B2 | 11/2009 | Spenik et al. |
| 8,200,242 | B2 | 6/2012 | Dietrich et al. |
| 8,314,736 | B2 | 11/2012 | Moslifeghi |
| 8,659,430 | B2 | 2/2014 | Bloy et al. |
| 8,896,483 | B2 | 11/2014 | Markin |
| 9,007,254 | B2 | 4/2015 | Vangen et al. |
| 9,194,939 | B2 | 11/2015 | Mukai et al. |
| 9,715,010 | B2 * | 7/2017 | Pu .................. H01Q 9/0407 |
| 9,778,342 | B2 | 10/2017 | Amizur |
| 9,885,773 | B2 | 2/2018 | Hehn et al. |
| 10,317,518 | B2 * | 6/2019 | Warnick ................. G01S 7/352 |
| 10,498,029 | B1 * | 12/2019 | Tran ..................... F21S 8/086 |
| 11,221,394 | B2 * | 1/2022 | Amihood ............. G01S 7/0232 |
| 11,495,881 | B1 * | 11/2022 | Harvey ................... H01Q 1/02 |
| 2004/0203908 | A1 | 10/2004 | Hind et al. |
| 2006/0071854 | A1 * | 4/2006 | Wilcox .................... G01S 5/14 |
| | | | 342/458 |
| 2010/0315280 | A1 | 12/2010 | Bakhtar |
| 2011/0183688 | A1 | 7/2011 | Dietrich et al. |
| 2012/0013500 | A1 | 1/2012 | Markin |
| 2014/0285373 | A1 | 9/2014 | Kuwahara et al. |
| 2015/0236778 | A1 | 8/2015 | Jalali |
| 2016/0261308 | A1 | 9/2016 | Khojastepour et al. |
| 2018/0074161 | A1 | 3/2018 | Rosenbaum et al. |
| 2019/0180587 | A1 | 6/2019 | Bergman |

OTHER PUBLICATIONS

Bai et al., "Overview of RFID-Based Indoor Positioning Technology," Geospatial Science Research_2, Melbourne: Geospatial Sciences, RMIT, ISBN: 978-0-9872527-1-5 Dec. 12, 2012.

Bouzakis et al., "Position Tracking for Passive UHF RFID Tags with the Aid of a Scanned Aray," Springerlink com, Int J Wireless Inf Networks (2013) 20:318-327 Jun. 23, 2013.

International Search Report and Written Opinion issued for PCT Application No. PCT/US2017/024329 dated Jun. 15, 2017.

Lakshmanan et al., "Practical Beamforming based on RSSI Measurements using Off-the-shelf Wireless Clients," IMC 09, Chicago, Illinois, USA, ACM 978-1-60558-770-7/09/11 Nov. 6, 2009.

Lui, et al., "Differences in RSSI readings made by different Wi-Fi chipsets: A limitation of WLAN localization," DOI: 10.1109/ICL-GNSS.2011.5955286, IEEE Xplore Jul. 2011.

Lymberopoulos et al., "A Realistic Evaluation and Comparison of Indoor Location Tehnologies: Experiences and Lessons Learned," IPSN, Seattle, Washington, USA, ACM 978-1-4503-3475-4/15/04, http://dx.doi.org/10.1145/2737095.2737726 Apr. 16, 2015.

Notice of Allowance issued for U.S. Appl. No. 15/082,688 dated Sep. 11, 2019.

Notice of Allowance issued for U.S. Appl. No. 16/707,987 dated Sep. 3, 2021.

Office Action issued for U.S. Appl. No. 15/082,688 dated Mar. 21, 2018.

Office Action issued for U.S. Appl. No. 15/082,688 dated Jan. 25, 2019.

Office Action issued for U.S. Appl. No. 16/707,987 dated Feb. 4, 2021.

Reynolds, "Low Frequency Indoor Radiolocation," Program in Media Arts and Sciences, Massachusetts Institute of Technology Jan. 10, 2003.

Tarng et al., "Three-Dimensional Modeling of 900-MHz and 2.44-GHz Radio Propagation in Corridors," IEEE Transactions on Vehicular Technology, vol. 46, No. May 2, 1997.

Ting et al., "The Study on Using Passive RFID Tags for Indoor Positioning," International Journal of Engineering Business Management, vol. 3, No. 1, pp. 9-15 2011.

\* cited by examiner

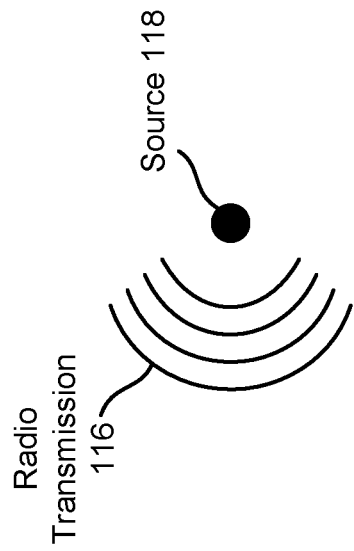
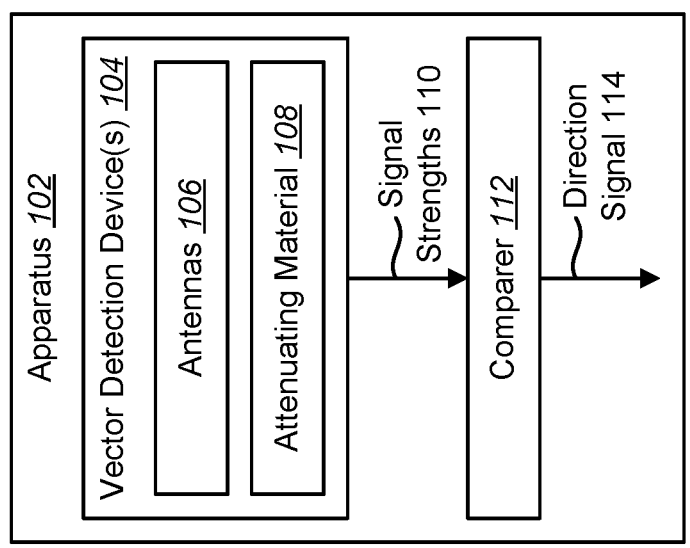
FIG. 1

SYSTEM AND METHODS FOR DETECTING A POSITION USING DIFFERENTIAL ATTENUATION

CROSS-REFERENCE TO RELATED APPLICATION

This application is a continuation of U.S. patent application Ser. No. 16/707,987, entitled "SYSTEM AND METHODS FOR DETECTING A POSITION USING DIFFERENTIAL ATTENUATION," filed Dec. 9, 2019, which is a continuation of U.S. patent application Ser. No. 15/082,688, entitled "SYSTEM AND METHODS FOR DETECTING A POSITION USING DIFFERENTIAL ATTENUATION," filed Mar. 28, 2016, both of which are incorporated by reference herein, in their entireties.

TECHNICAL FIELD

The present disclosure generally relates to electronic devices. More specifically, the present disclosure relates to systems and methods for detecting a position using differential attenuation.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. Some electronic devices are wireless devices.

Wireless devices transmit and/or receive electromagnetic signals. Examples of wireless devices include cellular phones, smartphones, smartwatches, tablet devices, laptop computers, drones, fitness trackers, wireless local area network (WLAN) devices, wireless personal area network (WPAN) devices (e.g., Bluetooth devices, etc.), gaming consoles, etc.

Wireless devices may be difficult to locate. For example, some approaches for locating wireless devices may be expensive, inaccurate, and/or may offer a very limited range. As can be observed from this discussion, systems and methods that improve locating technology may be beneficial.

BRIEF DESCRIPTION OF THE DRAWINGS

FIG. 1 is a block diagram illustrating an example of an apparatus in which systems and methods for detecting a position using differential attenuation may be implemented;

DETAILED DESCRIPTION

Figure 2:
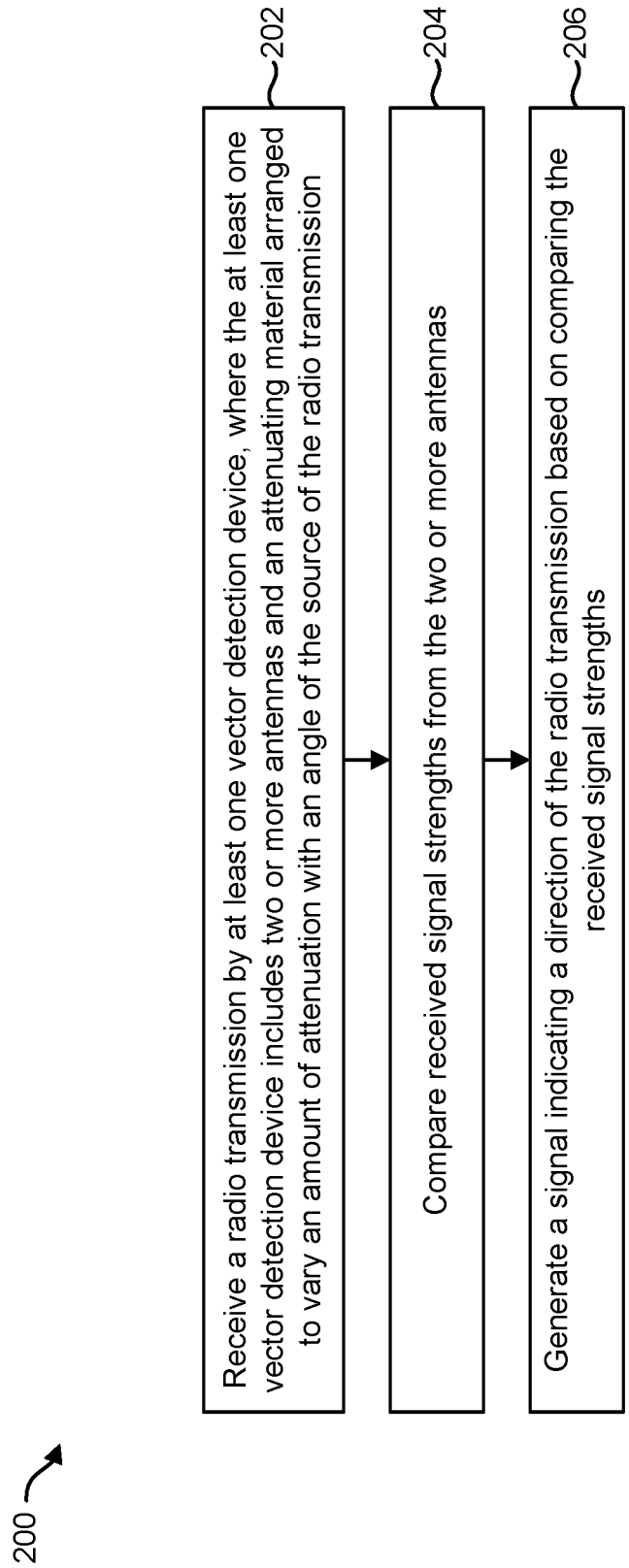
FIG. 2 is a flow diagram illustrating one configuration of a method for detecting a position using differential attenuation.

An apparatus for indicating a direction of a radio transmission is described. The apparatus includes at least one vector detection device including two or more antennas and an attenuating material between at least one of the antennas and a source of a radio transmission. The attenuating material is arranged to vary an amount of attenuation with an angle of the source with respect to the at least one of the antennas. The apparatus is configured to generate a signal indicating a direction of the radio transmission by comparing received signal strengths from the two or more antennas. The attenuating material may include a first antenna attenuator and a second antenna attenuator arranged in an opposite direction from the first antenna attenuator. The apparatus may include a differential amplifier and/or a processor configured to compare the received signal strengths from the two or more antennas.

The vector detection device(s) may include two vector detection devices. The two vector detection devices may be configured to generate signal strengths indicating orthogonal direction values relating to a location of the source in three-dimensional space. The two vector detection devices may include a first vector detection device configured to generate signal strengths indicating a horizontal angle value corresponding to a horizontal axis and a second vector detection device configured to generate signal strengths indicating a vertical angle value corresponding to a vertical axis.

The vector detection device(s) may include a non-attenuated antenna. The apparatus may be configured to compare an attenuated value and a non-attenuated value to generate a direction value.

The apparatus may include two or more radio frequency (RF) detectors. Each of the two or more RF detectors may be respectively coupled to each of the two or more antennas. Each of the two or more RF detectors may be configured to generate one of the received signal strengths.

The apparatus may be configured to decode the radio transmission to determine a media access control (MAC) address corresponding to the source. The apparatus may be further configured to annotate an image of the source with the MAC address. The apparatus may be a drone.

A method for indicating a direction of a radio transmission is also described. The method includes receiving a radio transmission by at least one vector detection device. The at least one vector detection device includes two or more antennas and an attenuating material between at least one of the antennas and a source of the radio transmission. The attenuating material is arranged to vary an amount of attenuation with an angle of the source with respect to at least one of the antennas. The method also includes comparing received signal strengths from the two or more antennas. The method further includes generating a signal indicating a direction of the radio transmission based on comparing the received signal strengths.

A non-transitory tangible computer-readable medium for indicating a direction of a radio transmission is also described. The computer-readable medium includes executable instructions for comparing received signal strengths from two or more antennas of at least one vector detection device. The at least one vector detection device includes the two or more antennas and an attenuating material between at least one of the antennas and a source of a radio transmission. The attenuating material is arranged to vary an amount of attenuation with an angle of the source with respect to at least one of the antennas. The computer-readable medium also includes executable instructions for generating a signal indicating a direction of the radio transmission based on comparing the received signal strengths.

The systems and methods disclosed herein may relate to position detection using differential attenuation. For example, the systems and methods disclosed herein may relate to determining the position of a radio emitter.

There are many applications of global positioning system (GPS) technology, including navigation, location-based advertising, and social networking. Other similar location systems, such as radio location based on cell tower signal strength, are also in use for the same set of applications either as an alternative or to augment the GPS data.

However, the use of GPS and cell location is limited in a few ways. First, they require that the object whose position is being determined receive information and report that information as part of the location determination system. Second, radio location may be imprecise. The spatial resolution of a GPS system can be on the order of meters. Finally, the use of GPS and cellular location requires that the system have good radio reception.

One primary technology used is determining the time of flight (TOF) of the radio signals either emanating from or received by a device being located. These systems can be effective, but are generally expensive and can be degraded by reflected waves.

Another location system in use is built around radio frequency identification (RFID) technology. In RFID systems, there are numerous RFID readers located at positions around a building. As things which have RFID tags move around, their location is logged in a centralized data store. This type of application may be well suited for hospitals where a particular piece of equipment may move around, but sometimes needs to be quickly located. Other RFID systems may include the reversed situation where a device including a reader moves around an environment where there are a lot of tags. The reader can upload tag information corresponding to its location. RFID systems suffer from being an expensive, short range solution that requires all positions be instrumented before they can be used. As can be observed, low cost systems and/or methods to locate an electronic device that have high accuracy and low cost may be beneficial.

Some configurations of the systems and methods disclosed herein may include one or more vector detection devices. An apparatus including one or more vector detection devices may generate a signal corresponding to the direction of a radio transmission along an axis. This may be accomplished by comparing the relative received signal strength from two antenna where at least one of the antenna has an attenuating material between the signal source and antenna arranged in such a way that the amount of attenuation varies with the angle of the signal source with respect to the receiving antenna. In some configurations, a detection device for an axis may have two antennas. Each of the antennas may have an attenuator in opposite configuration, such that the attenuation at one end of the axis is a maximum amount for one antenna and a minimum amount for the other antenna.

In some implementations, two detection devices may be employed to generate two orthogonal direction values relating to a determination of signal source in a three-dimensional (3D) space. Given two detection devices, for example, one may be used to generate a horizontal (e.g., left/right) angle value, while the other may be used to generate a vertical (e.g., up/down) angle value. It should be noted that in some situations, it may not be necessary to determine both a vertical (e.g., up/down) and a horizontal (e.g., left/right) value. Accordingly, the apparatus may include only one detection device in some configurations. It should also be noted that in some situations, a single attenuated value may be compared to a non-attenuated signal to yield a direction.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating an example of an apparatus 102 in which systems and methods for detecting a position using differential attenuation may be implemented. For example, the apparatus 102 may indicate a direction of a radio transmission 116. The apparatus 102 may be an electronic device. For example, the apparatus 102 may include one or more electrical and/or electronic components (e.g., resistors, transistors, capacitors, inductors, etc.). The apparatus 102 may include one or more vector detection devices 104 and/or a comparer 112.

The vector detection device(s) 104 may include antennas 106 and attenuating material 108. For example, each vector detection device 104 may include two or more antennas 106. Examples of antennas 106 that may be implemented include dipole antennas, monopole antennas, patch (e.g., microstrip) antennas, slot antennas, chip antennas, etc. The antennas 106 may receive a radio transmission 116 from a source 118. Examples of the source 118 include radio frequency (RF) emitters, transmitters, wireless devices, cellular phones, smartphones, smartwatches, tablet devices, drones, etc. Initially, the direction and/or location of the source 118 relative to the apparatus 102 may be unknown.

The attenuating material 108 may be a material that attenuates (e.g., reduces) an incoming radio transmission 116. For example, the attenuating material 108 may be utilized to attenuate the incoming radio transmission 116 (e.g., signal). The attenuating material 108 may be situated between at least one of the antennas 106 and the source 118 of the radio transmission 116. The attenuating material 108 may be arranged to vary an amount of attenuation with an angle of the source 118 with respect to one or more of the antennas 106. The attenuating material 108 may be included in one or more attenuators. An attenuator may be a structure that includes some or all of the attenuating material 108. For example, an attenuator may be all or part of the attenuating material 108. In some configurations, one antenna attenuator may be arranged in an opposite direction from another antenna attenuator.

The attenuating material 108 may be any material that has one or more of the following properties. Attenuating material 108 of a given thickness may attenuate more than attenuating material 108 of a lesser thickness. A portion of attenuating material 108 of a given thickness may attenuate approximately the same as another portion of attenuating material 108 at the same thickness. An attenuation coefficient of the attenuating material 108 may be suitable for attenuating some, but not all, of the incoming radio frequency (RF) power from a source 118 (e.g., transmitter). Some factors that may impact the selection of the attenuating material 108 may include cost, weight, and/or size of material needed. Examples of the attenuating material 108 may include graphene foam, ceramics, and/or polylactic acid (PLA) mixed with iron powder, etc.

Example illustrations for attenuating material 108 (e.g., attenuators) in the Figures may show material in a rough wedge shape. It should be noted that other shapes (e.g., polyhedra, domes, hemiellipsoids, portions of spheres, parabolic shapes, combinations of curved and angular shapes, etc.) may be utilized in order to adjust (e.g., improve, optimize, etc.) the amount of material utilized and/or the field of view. One characteristic of the attenuating material 108 may be that transmissions passing through identical thicknesses of attenuating material 108 may be indistinguishable from each other, for example. It should be noted that specialized sensing applications may utilize customized attenuator geometry.

In some configurations, angle-dependent attenuation may only exist in one of two antennas 106 used to determine an angle on a plane. One antenna 106 may receive an non-attenuated signal to establish a baseline signal strength while a second antenna 106 may receive a signal whose strength depends on the angle of the source 118 (e.g., emitter) due to the amount of attenuating material 108 (e.g., attenuator) the radio transmission 116 (e.g., signal) has passed through. For example, one vector detection device 104 may include a non-attenuated antenna 106 and another vector detection device 104 may include an attenuated antenna. An attenuated value from the attenuated antenna 106 may be compared with a non-attenuated value from the non-attenuated antenna 106 to generate the direction signal 114 (e.g., a direction value). It should be noted that this single-attenuated antenna arrangement may not yield as fine resolution for position determination in some configurations. Advantages of this single-attenuated antenna arrangement may include detecting the presence of weak signals and/or allowing strong signals for decoding information on the signal.

In some cases, the radio transmission 116 (e.g., RF signals) may originate from a consumer device. The radio transmission 116 may be a Wi-Fi signal, Bluetooth signal, ZigBee signal, and/or or cellular signal in the 2.4 gigahertz (GHz) industrial, scientific, and medical (ISM) band, for example. These signals may use various channel access methods including time division, frequency division, code division, etc. It should be noted that the apparatus 102 (e.g., vector detection device(s) 104, vector detection system, etc.) may be able to detect a signal that is present at a given channel within a band for a short period of time and/or may save the timing information in order to correlate data transmitted within the channel over various time periods and frequencies to a particular transmission source 118. In some implementations, the apparatus 102 may detect and/or filter out various communications interference sources within the channel.

In some configurations, the vector detection device(s) 104 may include one or more RF power detectors. For example, each of the antennas 106 may be coupled to an RF detector (e.g., an RF power detector). An RF detector may be a circuit utilized to determine a magnitude (e.g., signal strength) of a received radio transmission 116. For instance, one or more RF detectors may be employed in the process of decoding received data, monitoring the power level of outgoing transmissions, and/or presenting users of devices with information relating to the quality of radio network connectivity. One example of an RF power detector is the Maxim MAX2015 logarithmic detector, which may provide a direct current (DC) output relating to RF signal input power. The Maxim MAX2015 is advertised to operate over a 75 decibel (dB) range of input power. It should be noted that the term "couple" and variations thereof as used herein may denote a direct connection (without intervening component(s)) or an indirect connection (with one or more intervening components).

The vector detection device(s) 104 may provide signal strengths 110. The signal strengths 110 may be one or more signals that indicate strengths of signals received by the antennas 106. For example, the signal strengths 110 may include and/or indicate one or more signal amplitudes, one or more signal magnitudes, and/or one or more measured strength values, etc. For instance, the antennas 106 may be coupled to RF detectors to generate the signal strengths 110 (e.g., a signal corresponding to the receive signal strength). The signal strengths 110 may indicate direction values. For example, the signal strengths 110 may be compared in order to determine one or more direction values.

In some configurations, two vector detection devices 104 may be arranged orthogonally. For example, two vector detection devices 104 may be configured to generate signal strengths 110 indicating orthogonal direction values relating to a location of the source 118 in 3D space. For instance, a first vector detection device 104 may be configured to generate signal strengths indicating a horizontal angle value corresponding to a horizontal axis and a second vector detection device 104 may be configured to generate signal strengths indicating a vertical angle value corresponding to a vertical axis.

The vector detection device(s) 104 may be coupled to and/or may include a comparer 112. For example, the comparer 112 may be separate from the vector detection device(s) 104 or may be included in (e.g., integrated into) the vector detection device(s) 104. The comparer 112 may be implemented in hardware (e.g., circuitry) or a combination of hardware and software (e.g., a processor with instructions). The vector detection device(s) 104 may provide signal strengths 110 to the comparer 112. The comparer 112 may compare the received signal strengths 110 to generate a direction signal 114 (e.g., a signal indicating a direction of the radio transmission 116).

In some configurations, the comparer 112 may include a differential amplifier. The signal strengths 110 may be provided to the ADC stage and/or differential amplifier. In configurations with a differential amplifier, the differential amplifier may compare the received signal strengths 110. For example, the differential amplifier may generate a signal proportional to the ratio between the signal strengths 110 corresponding to two antennas measuring the same axis. The comparer 112 may generate a direction signal 114 indicating a direction corresponding to the ratio between the signal strengths 110.

In some configurations, the comparer 112 may convert the signal strengths 110 (e.g., a measured signal strength ratio) into a direction signal 114 (e.g., detected angle) using a numerical conversion model. The conversion model may be established using a calibration step where an emitter is placed at two or more known angles in relation to the vector detection device(s) 104. These readings may be used to establish a relationship between a signal strength ratio and a transmission source angle. The relationship along with known properties of the attenuating material 108 (e.g., attenuator) and/or vector detection device(s) 104 may be used to determine a formula for mapping an angle to a detected ratio. For example, if the thickness of the attenuating material 108 increases at a linear rate as the angle increases, then the measured calibration data may be utilized in a linear regression to create a formula for conversion of ratio to angle. In some configurations, some sort of regression analysis or other form of numerical modeling appropriate for the calibration of a conversion process based on measurements of the received input signals at a given apparatus 102 (e.g., device) may be utilized. Additionally or alternatively, a data table may be created during manufacture of an apparatus 102 (e.g., device) where a controlled testing environment may be used to obtain actual signal strength versus ratio data. Additionally or alternatively, a known coefficient of attenuation for a given thickness along with a known geometry of the attenuating material 108 (e.g., attenuator) may be incorporated to create a conversion model (e.g., function).

In some configurations, the comparer 112 may include an analog-to-digital converter (ADC) stage. In configurations with an ADC stage, the ADC stage may convert the signal strengths 110 (e.g., analog signal strengths) into digital signal strengths. The digital signal strengths (e.g., ADC values) may be provided to a processor (e.g., central processing unit (CPU)). The processor may generate the direction signal 114 by comparing the signal strengths 110 from two or more antennas 106. For example, the processor may calculate a ratio of signal strengths 110 and select a direction signal 114 corresponding to the ratio.

The direction signal 114 may indicate a value representative of the transmitting angle. For example, the direction signal 114 may indicate a direction at which the radio transmission 116 was received. The direction of the radio transmission 116 may indicate a direction to the source 118 relative to the antennas 106 (e.g., vector detection device(s) 104 and/or apparatus 102).

Given an angle that corresponds to a single axis, an orthogonal angle may be combined to give a vector in three dimensions (3D). It will be clear to one skilled in computer vision or 3D geometry that multiple vector detection devices 104 (e.g., detectors), each of which indicates (e.g., outputs) a vector, may be utilized to locate the source 118 (e.g., transmitting point) in 3D space. Alternatively, a single vector detection device 104 (e.g., detector) with suitable calibration may be utilized with a camera to correlate positions in a scene and transmission sources 118 found by the vector detection device 104.

It should be noted that acquiring the direction signal 114 (e.g., a vector) associated with a radio transmission may be only a portion of some configurations of the systems and methods disclosed herein. In some configurations, a received radio packet may be decoded in order to identify radio data associated with the radio transmission 116. For example, a media access control (MAC) address may be linked to the detected vector(s) in order to relate the identity of the source 118 (e.g., transmitter) to their location(s).

The direction signal 114 may be stored in memory, transmitted (with a wireless and/or wired communication interface), and/or utilized by the apparatus 102. In some configurations, the direction signal 114 may be provided to a tracker implemented on the apparatus 102 or a remote device. The tracker may record the location and/or series of locations of the source 118. Additionally or alternatively, the tracker may present direction information (e.g., numerical direction (e.g., angle), an image (e.g., icon, captured image) representing the source 118, and/or audio (e.g., language, sound indicators, etc.), etc.) based on the direction signal 114. The direction information may be presented on a display and/or output with a speaker. Additionally or alternatively, the direction signal 114 may be provided to a targeter implemented on the apparatus 102 or a remote device. The targeter may utilize the direction signal 114 to target the source 118. For example, the targeter may aim a camera, an antenna (e.g., electromagnetic emitter, dish antenna, etc.), a light (e.g., laser), a water cannon, and/or a weapon at the source 118. This may allow for one or more functions such as capturing images of the source 118, surveilling the source 118, receiving communications from the source 118, eavesdropping on communications of the source 118, jamming communications of the source 118, blinding the source 118, disabling the source 118, and/or destroying a source 118 (e.g., drone, camera, etc.) and/or a user of a source 118. More specific description of applications of the direction signal 114 that may be implemented in the apparatus 102 or a remote device is given as follows.

The systems and methods disclosed herein may be implemented for a variety of applications. For example, numerous configurations of this position detection technology may be implemented. One application is in the detection of drone-related activity. For example, the systems and methods disclosed herein may be implemented in ground-based devices to identify airborne transmission that is consistent with moving drone devices. The systems and methods disclosed herein may have cost advantages over other technologies such as those which detect angles through the use of receivers with a restricted angle of reception. The systems and methods disclosed herein may be likely implemented less expensively than drone location systems that compare arrival time of transmissions in various receivers. The use of lightweight attenuation material may be utilized in some configurations such that drones equipped with these devices may locate other drones, drone operators, and/or radio repeaters relaying drone instructions.

The systems and methods disclosed herein may be implemented for security and advertising applications in some configurations. For example, the identification of transmission location may be used to identify which consumer in a location or camera scene possesses which of several transmission devices. Since some technologies use the same frequency spectrum, it may be possible to create a position detection system to link the identity of an Institute of Electrical and Electronics (IEEE) 802.11 (e.g., "Wi-Fi") transmission to a Bluetooth transmission.

Some configurations of the systems and methods disclosed herein may be implemented for indoor applications. An indoor application suitable for a lower-frequency transmitter is 3D positioning of computer input devices. This application may involve transmission devices used as input devices for a 3D software application. This application may allow multiple low-cost transmitters to be located using triangulation by multiple detection devices.

In some applications, such as some approaches to detection of consumer devices and/or detection of drone position, there may be no ability to affect (e.g., control) the operating frequency of the device transmissions. In this case, the characteristics of the transmission may need to be taken into account. For example, the fact that Wi-Fi signals are subject to reflection and multipath interference may mean that the apparatus 102 (e.g., vector detection device(s) 104, detection hardware, etc.) may utilize a very fast RF power detection circuit in order to detect the angle of the signal before significant power from reflections alter the perceived transmission source. In some instances of drone detection, multipath interference may not have significant impact to the prevalence of line-of-site signal strength relative to the strength of reflected power.

In applications where the transmitter can be configured and/or selected, an appropriate frequency may be selected to mitigate environmental factors. For example, for indoor location of 3D position detection of game pieces, a lower frequency like 75 megahertz (MHz) may result in much less interference from reflection and allow more line-of-sight propagation through the human body. In the case of low-frequency operation, the antenna geometry may be a significant factor. Ideally, the geometry of the antenna should not interfere with the angular attenuation induced by the attenuator element. This means that the attenuation resulting from the angle of reception along any axis should be consistent with the attenuating element or insignificant as a whole. For example, the antenna may be formed along a line that is orthogonal to the angle being measured. Error induced by antenna geometry may be mitigated by having two separate antennas 106 receiving through two separate attenuators.

In some configurations, the apparatus 102 may perform one or more of the functions, procedures, methods, steps, etc., described in connection with one or more of FIGS. 1-13. Additionally or alternatively, the apparatus 102 may include one or more of the structures described in connection with one or more of FIGS. 1-13.

FIG. 2 is a flow diagram illustrating one configuration of a method 200 for detecting a position using differential attenuation. The method 200 may be performed by the apparatus 102 described in connection with FIG. 1. The apparatus 102 may receive 202 a radio transmission 116 by at least one vector detection device 104. This may be accomplished as described in connection with FIG. 1. The at least one vector detection device 104 may include two or more antennas 106 and an attenuating material 108 arranged to vary an amount of attenuation with an angle of the source 118 of the radio transmission 116. The attenuating material 108 may be situated between at least one of the antennas 106 and the source 118 (e.g., emitter, transmitter, etc.) of the radio transmission 116.

The apparatus 102 may compare 204 received signal strengths 110 from the two or more antennas 106. This may be accomplished as described in connection with FIG. 1. For example, the apparatus 102 may compare the signal strengths 110 using a differential amplifier. Additionally or alternatively, the apparatus 102 may compare the signal strengths 110 using a processor. In some configurations, the apparatus 102 may convert analog signal strengths to digital signal strengths using an ADC stage. Comparing 204 the received signal strengths 110 may include generating a signal proportional to a ratio between signal strengths 110 from different antennas 106. For example, comparing 204 the received signal strengths 110 may include determining (e.g., calculating, computing, etc.) a ratio between signal strengths 110 from two antennas 106. In some configurations, the apparatus 102 (e.g., comparer 112, processor, etc.) may calculate a ratio of (e.g., divide) the signal strengths 110.

The apparatus 102 may generate 206 a signal indicating a direction of the radio transmission 116 based on comparing the received signal strengths 110. This may be accomplished as described in connection with FIG. 1. For example, the apparatus 102 may generate a direction signal 114 that indicates the direction of the radio transmission 116. The compared signal strengths 110 (e.g., the signal proportional to the ratio of the signal strengths 110, the ratio of the signal strengths 110, etc.) may be mapped to a range of directions. For example, the field of view (e.g., observable range) of a pair of antennas may be divided into a set of directions (e.g., a number of angular increments). The signal proportional to the ratio of signal strengths 110 may correspond to one of the set of directions. For example, each of the set of directions may correspond to a ratio or range of ratios. The apparatus 102 may select a direction that most closely corresponds to the compared signal strengths 110 (e.g., ratio). In some approaches, the apparatus 102 may look up a direction signal 114 (e.g., an angle) associated with the compared signal strengths 110 (e.g., associated with the ratio of signal strengths 110). Additionally or alternatively, the apparatus 102 may produce a direction signal 114 (e.g., an angle) corresponding to the signal proportional to the ratio of the signal strengths 110 (e.g., differential amplifier output).

Figure 3:
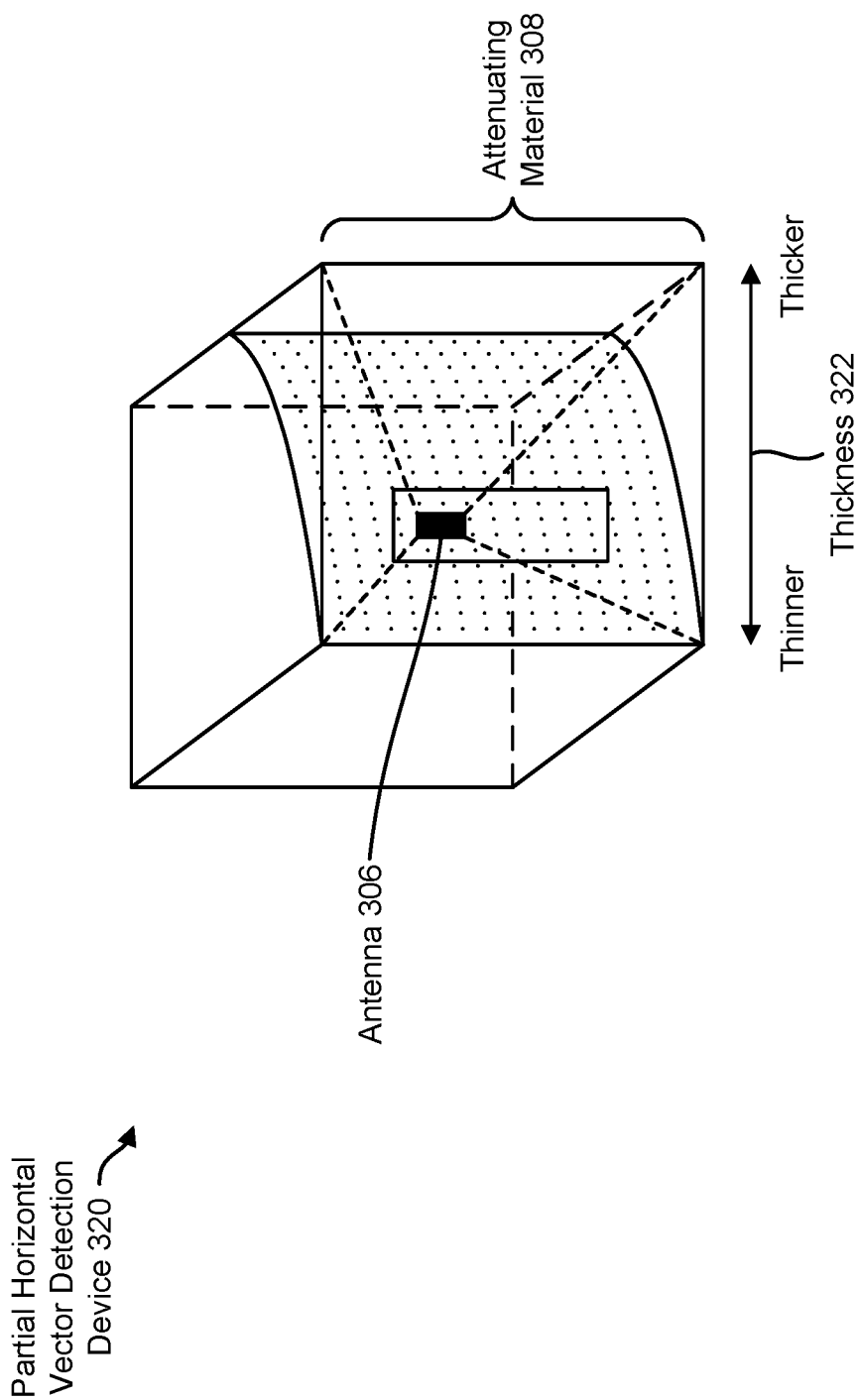
FIG. 3 is a diagram illustrating a three-dimensional (3D) view of one example of a partial horizontal vector detection device.

FIG. 3 is a diagram illustrating a 3D view of one example of a partial horizontal vector detection device 320 (e.g., one half of a horizontal detector). The partial horizontal vector detection device 320 may be an example of a part of the vector detection device 104 described in connection with FIG. 1. In the foreground of FIG. 3, the attenuating material 308 is between the antenna 306 and the viewer. The antenna 306 is situated (e.g., mounted, held up, etc.) to be behind the center of the attenuating material 308 (e.g., attenuator). The diagram in FIG. 3 illustrates a horizontal variation in thickness 322. In particular, the attenuating material 308 on the right side is thicker than the attenuating material 308 on the left side. The attenuating material 308 is uniform (e.g., does not change thickness) from top to bottom.

Figure 4:
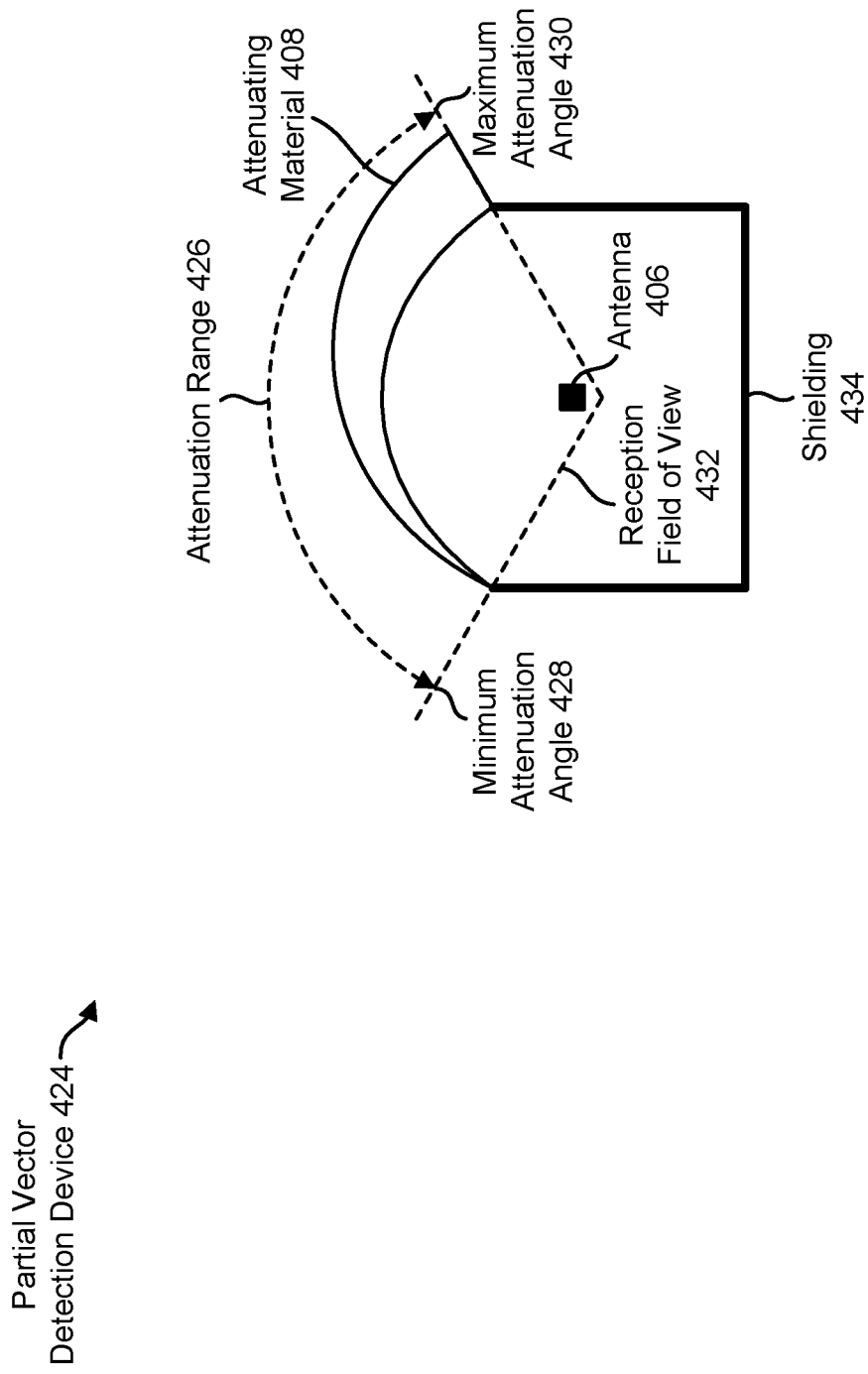
FIG. 4 illustrates one example of a top view of a partial vector detection device.

FIG. 4 illustrates one example of a top view of a partial vector detection device 424. Specifically, FIG. 4 illustrates one example of a portion of a vector detection device corresponding to one antenna 406, with different parts labeled. The partial vector detection device 424 may be an example of a portion of the vector detection device 104 described in connection with FIG. 1.

In the example illustrated in FIG. 4, the partial vector detection device 424 includes attenuating material 408, an antenna 406, and optional shielding 434. The shielding 434 may prevent radio reception except through the attenuating material 408 (e.g., attenuator). In this example, the reception field of view 432 is approximately 120 degrees. It should be noted that the reception field of view 432 may be greater than or less than 120 degrees in other configurations.

As illustrated in FIG. 4, the attenuating material 408 (e.g., attenuator) varies in thickness over the reception field of view 432 (e.g., over the attenuation range 426). Signals passing through the attenuation material 408 (e.g., attenuator) at a minimum attenuation angle 428 may be subject to very little attenuation. For example, signals passing through the thinnest part may be attenuated by 1 dB. Signals passing through the attenuating material 408 at the maximum attenuation angle 430 may be subject to maximum attenuation. For example, signals passing through the thickest part may be attenuated by 20 dB.

Figure 5:
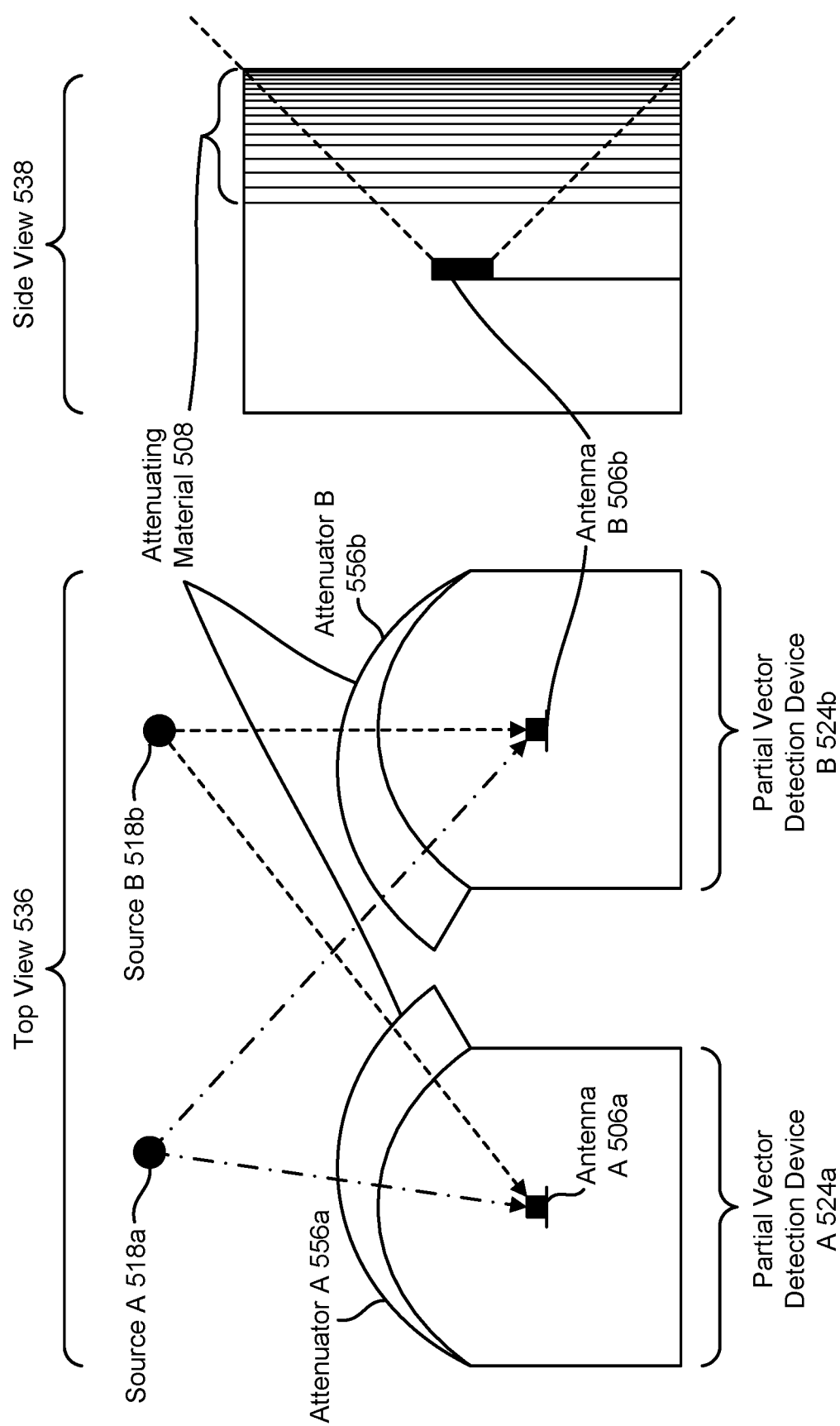
FIG. 5 illustrates examples of a top view and a side view of a vector detection device.

FIG. 5 illustrates examples of a top view 536 and a side view 538 of a vector detection device. In particular, the top view 536 illustrates partial vector detection device A 524a and partial vector detection device B 524b. Each of partial vector detection device A 524a and partial vector detection device B 524b may be an example of the partial vector detection device 424 described in connection with FIG. 4. Additionally or alternatively, a combination of partial vector detection device A 524a and partial vector detection device B 524b may be an example of the vector detection device 104 described in connection with FIG. 1. Partial vector detection device A 524a and partial vector detection device B 524b viewed from above show how two different signals from source A 518a (e.g., an emitter, transmitter, etc.) and source B 518b (e.g., an emitter, transmitter, etc.) pass through different thicknesses of attenuating material 508 in order to reach antenna A 506a and antenna B 506b. The side view 538 provides another perspective of the attenuating material 508 and antenna B 506b.

As illustrated in FIG. 5, the attenuating material 508 may include attenuator A 556a (e.g., a first antenna attenuator) and attenuator B 556b (e.g., a second antenna attenuator). Attenuator B 556b may be arranged in an opposite direction from attenuator A 556a.

The systems and methods disclosed herein may utilize attenuating material (e.g., one or more attenuators) that reduces the incoming RF power by a measurable amount depending on the angle of a source (e.g., transmitting device) with respect to the receiving antenna. The amount of RF power attenuated may be implemented (e.g., selected) with consideration of the tradeoffs between sensitivity, resolution, and/or cost. For example, if the attenuator reduces the incoming signal by 50 dB at the thickest part, and the RF detector input has a maximum −90 dB of sensitivity, then the vector detection device may only be able detect position information at this extreme angle if the incoming signal exceeds −40 dB of incoming power. This has the effect of reducing the range of the vector detector device due to attenuation over the entire receiving angle, and/or the effect of reducing the reception field of view (e.g., effective receiving angle).

In another example, if the attenuation is selected such that the maximum attenuation is 3 dB, then the effect of incoming angle may be very difficult to determine. For instance, an incoming signal of −60 dB may be attenuated by 1.2 dB at one antenna and 1.9 dB at another antenna. If the total incoming field of view is divided into 300 angular increments, then the neighboring angle can be compared as illustrated in Table 1. It should be noted that the term "receive" and variations thereof may be abbreviated as "RX" as shown in Table 1.

TABLE 1

|  | Attenuation at Antenna A | Attenuation at Antenna B | Antenna A RX power | Antenna B RX Power | Power Ratio |
|---|---|---|---|---|---|
| Angle 1 | 1.2 dB | 1.9 dB | 58.8 | 58.1 | 1.012048 |
| Angle 2 | 1.19 dB | 1.91 dB | 58.81 | 58.09 | 1.012394 |

As illustrated by the example in Table 1, different attenuation ratios relate to different received antenna powers. Additionally, different angles may correspond to (e.g., may map to) different power ratios. For example, the comparer 112 may compare antenna A RX power to antenna B RX power to produce (e.g., select) a corresponding direction signal 114 (e.g., angle). In some configurations, the comparer 112 may determine (e.g., calculate, compute, etc.) the power ratio of antenna A RX power and antenna B RX power to produce a corresponding direction signal 114 (e.g., angle).

Figure 6:
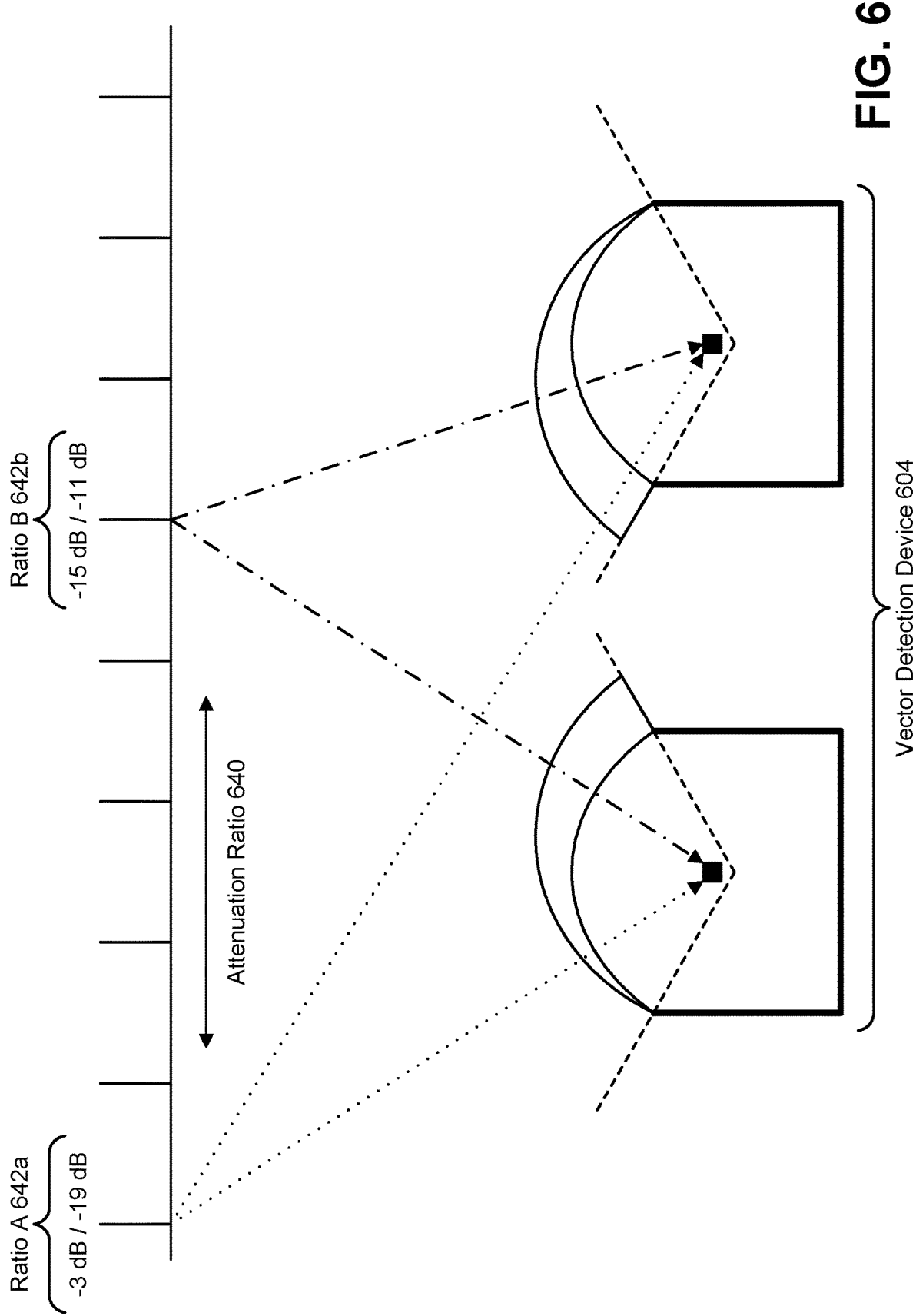
FIG. 6 is a diagram illustrating an example of a relationship between the direction of a radio transmission and attenuation ratio.

FIG. 6 is a diagram illustrating an example of a relationship between the direction of a radio transmission and attenuation ratio. Specifically, FIG. 6 shows a comparison of different induced signal strength attenuation depending on the direction of radio transmissions (e.g., transmitting angles) of a horizontal arrangement viewed from above. As illustrated in FIG. 6, the attenuation ratio 640 is related to the direction (e.g., angle) of the incoming signal and the relationship is not affected by signal strength. For example, ratio A 642a (e.g., −3 dB/−19 dB) corresponds to a first direction relative to the vector detection device 604, while ratio B 642b (e.g., −15 dB/−11 dB) corresponds to a second direction relative to the vector detection device 604.

Figure 7:
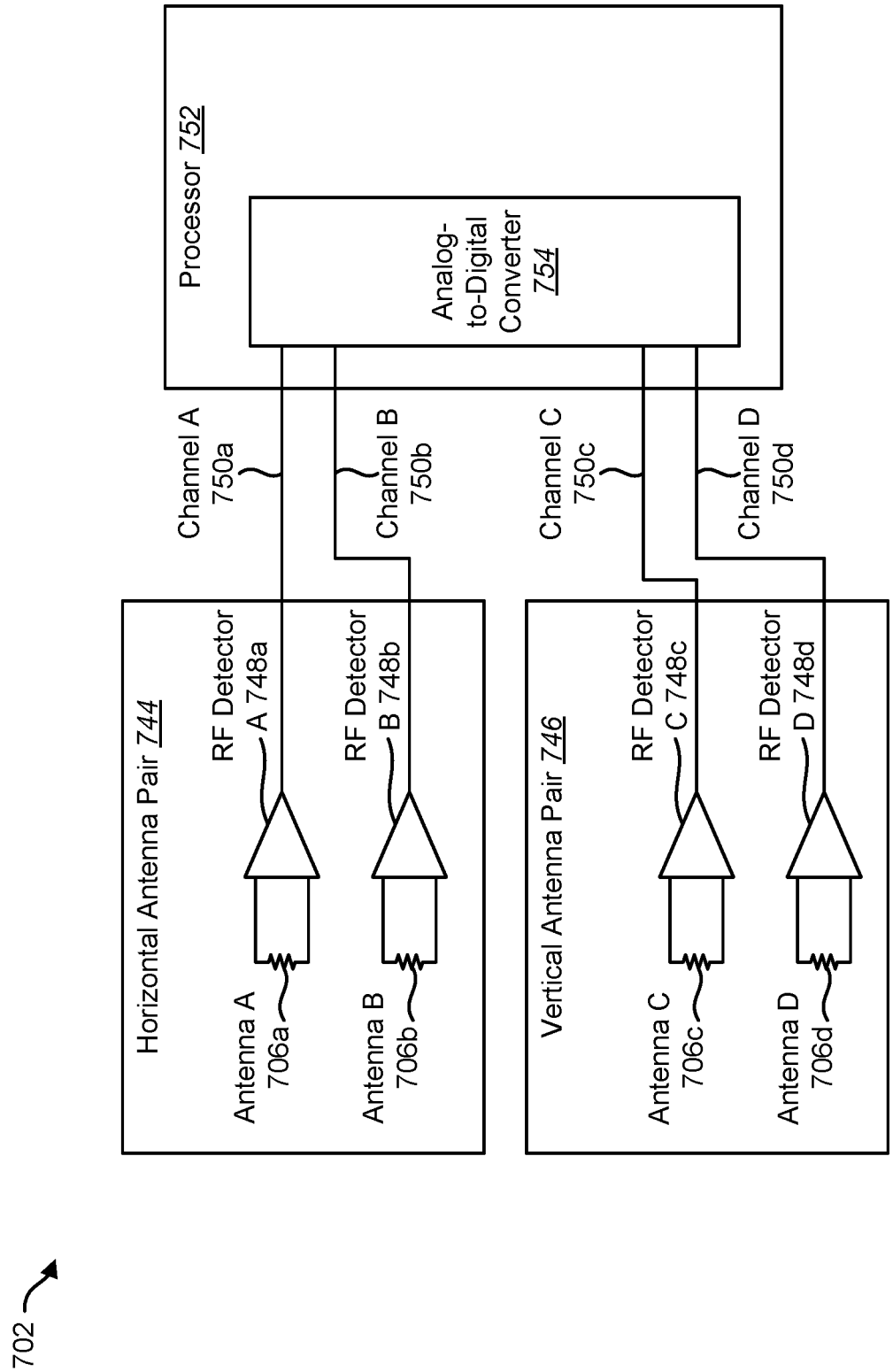
FIG. 7 is a block diagram illustrating a more specific configuration of an apparatus for indicating a direction of a radio transmission.

FIG. 7 is a block diagram illustrating a more specific configuration of an apparatus 702 for indicating a direction of a radio transmission. In particular, FIG. 7 illustrates a sample circuit block diagram of an apparatus 702. In this example, the apparatus 702 includes two vector detection devices. A first vector detection device includes a horizontal antenna pair 744 and a second vector detection device includes a vertical antenna pair 746. The horizontal antenna pair 744 may include antenna A 706a and antenna B 706b. The vertical antenna pair 746 may include antenna C 706c and antenna D 706d. Antenna A 706a and antenna B 706b may be oriented orthogonally in relation to antenna C 706c and antenna D 706d. The first vector detection device (e.g., the horizontal antenna pair 744) and the second vector detection device (e.g., the vertical antenna pair 746) may be configured to generate signal strengths indicating orthogonal direction values relating to a location of a source (e.g., emitter, transmitter, etc.) in 3D space. For example, the horizontal antenna pair 744 may provide signal strengths on channel A 750a and channel B 750b that indicate a horizontal angle value corresponding to horizontal axis (e.g., that indicate a direction in a horizontal plane). Additionally, the vertical antenna pair 746 may provide signal strengths on channel C 750c and channel D 750d that indicate a vertical angle value corresponding to a vertical axis (e.g., indicate a direction in a vertical plane). It should be noted that although horizontal and vertical orientations are given as an example of an orthogonal arrangement, other orthogonal arrangements may be implemented in accordance with the systems and methods disclosed herein.

As illustrated in FIG. 7, each antenna 706a-d may be coupled to a corresponding RF detector 748a-d, which in turn may be coupled to an ADC 754 (e.g., an ADC stage) in some configurations. Each RF detector 748a-d may produce a respective received signal strength based on the received signals from each respective antenna 706a-d. In some implementations, one or more of the antennas 706a-d may be coupled (e.g., connected) to one or more switches in order to allow one or more RF detectors and/or the ADC(s) 754 to handle more than one signal.

The ADC 754 may convert the analog signal strengths provided by the RF detectors 748a-d (on channels A-D 750a-d) from analog signals to digital signals. The digitized signal strengths may be provided to the processor 752.

As described herein, the apparatus 702 may include a processor 752 in some configurations. It should be noted that the ADC 754 (e.g., ADC stage) may be included in the processor 752 (e.g., may be integrated in the processor 752) or may be separate from the processor 752. The processor 752 may be an example of the comparer 112 described in connection with FIG. 1.

The processor 752 may compare the (digitized) received signal strengths to generate a signal indicating a direction of the radio transmission. This may be accomplished as described above in connection with FIG. 1.

Figure 8:
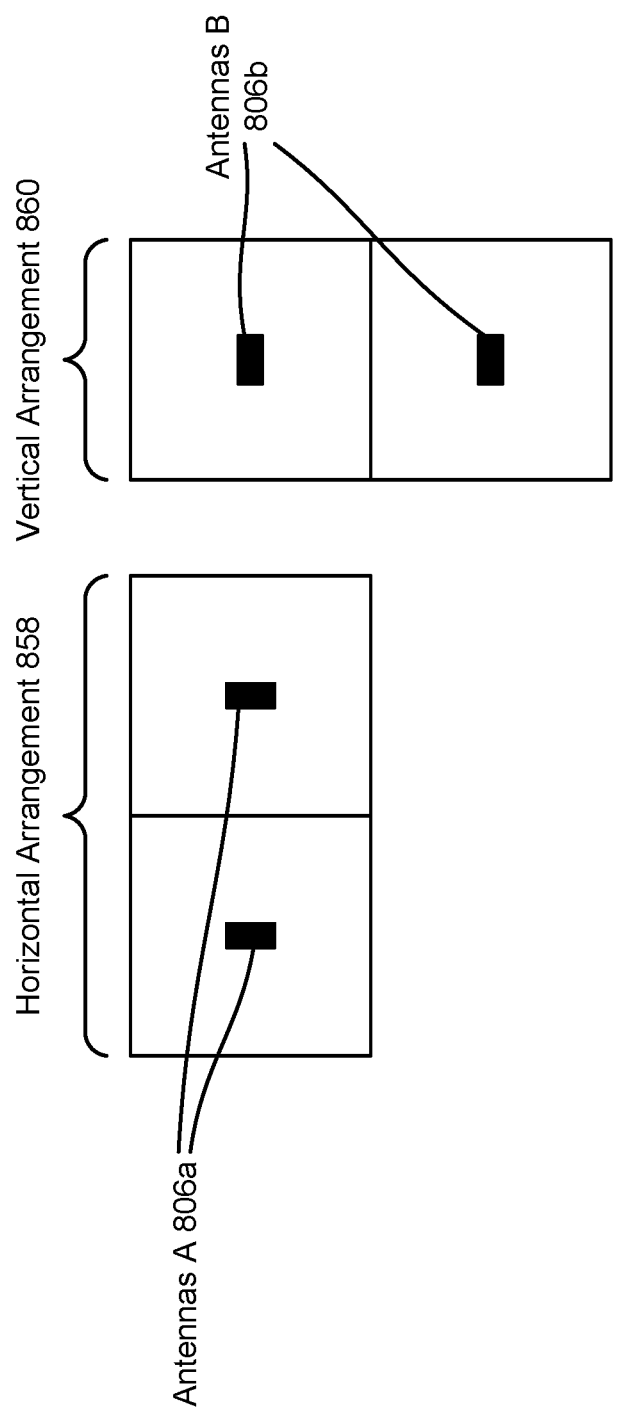
FIG. 8 is a diagram illustrating a horizontal arrangement and a vertical arrangement of two vector detection devices.

FIG. 8 is a diagram illustrating a horizontal arrangement 858 and a vertical arrangement 860 of two vector detection devices. The horizontal arrangement 858 and the vertical arrangement 860 may be examples of arrangements of the vector detection devices described in connection with one or more of FIGS. 1-7. As illustrated in FIG. 8, the horizontal arrangement 858 may include antennas A 806a, while the vertical arrangement 860 may include antennas B 806b.

Some configurations of the apparatus 102 described herein may include only one of the horizontal arrangement 858 or the vertical arrangement 860. In other configurations, the apparatus 102 may include both the horizontal arrangement 858 and the vertical arrangement 860. For example, two vector detection devices 104 may be arranged orthogonally as described herein to generate signal strengths 110 indicating orthogonal direction values relating to a location of a source in 3D space.

Figure 9:
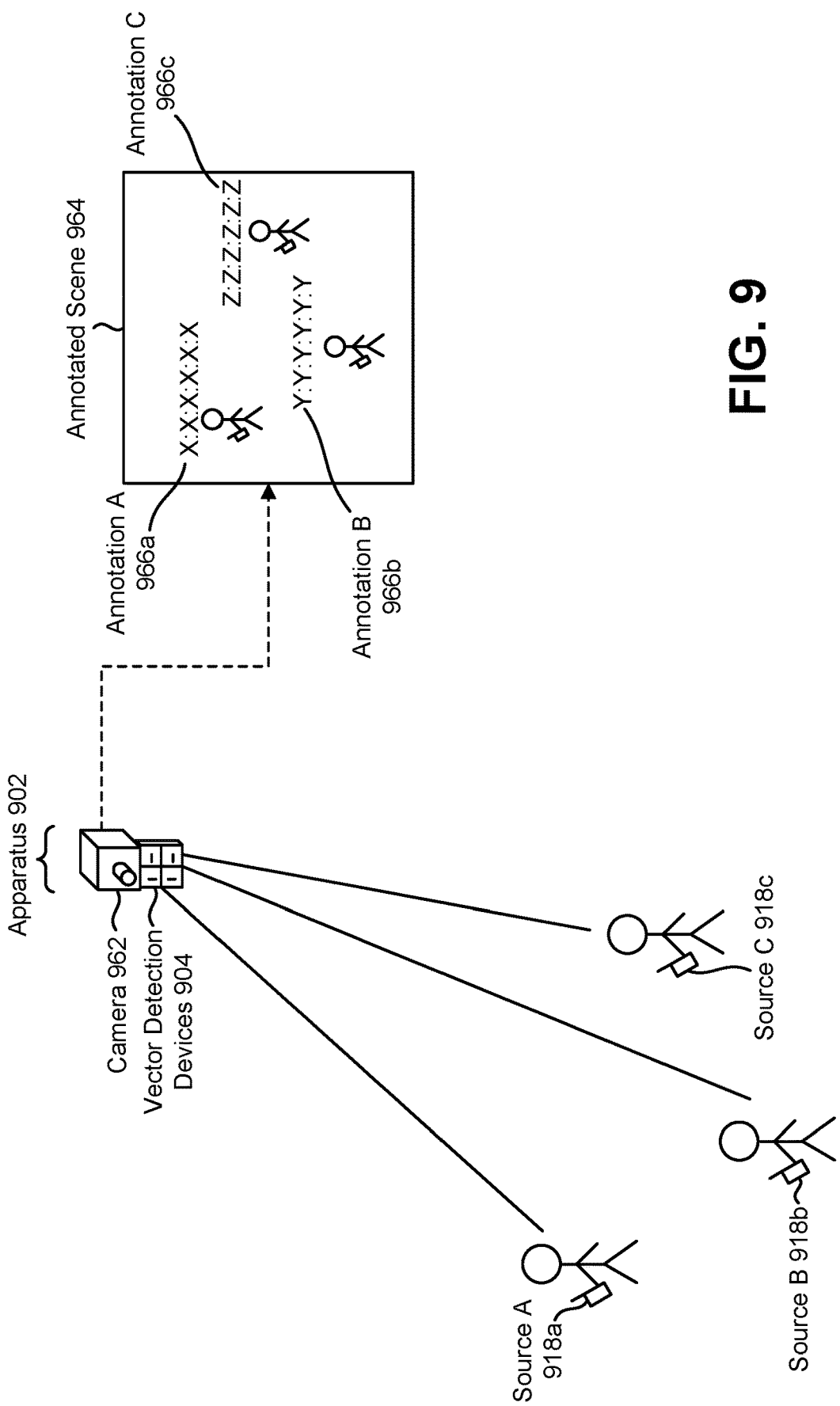
FIG. 9 is a diagram illustrating one configuration of an apparatus in which systems and methods for indicating a direction of a radio transmission may be implemented.

FIG. 9 is a diagram illustrating one configuration of an apparatus 902 in which systems and methods for indicating a direction of a radio transmission may be implemented. In this example, the apparatus 902 includes vector detection devices 904 and a camera 962. It should be noted that an apparatus may not include the camera in other examples (e.g., the apparatus may communicate with a remote device including a camera).

In this example, the vector detection devices 904 may receive signals from several sources 918a-c. For example, the sources 918a-c may be wireless devices (e.g., smartphones, tablet devices, laptop computers, drones, etc.). For each of the sources 918a-c, the apparatus 902 may compared received strength signals to generate signals indicating directions of the sources 918a-c. For example, the vector detection devices 904 may be arranged vertically and horizontally to provide horizontal axis and vertical axis angles corresponding to the sources 918a-c.

The camera 962 may capture one or more images (e.g., a scene) of the sources 918a-c and/or users of the sources 918a-c. In some configurations, the apparatus 902 may decode signals received from one or more of the sources 918a-c. For example, the apparatus 902 may decode media access control (MAC) information (e.g., Wi-Fi MAC address(es)) corresponding to one or more of the sources 918a-c. Image data from the camera 962 may be combined with direction information and/or decoded signal information to produce an annotated scene 964. For example, the apparatus 902 may produce an annotated scene 964 with annotations 966a-c corresponding to one or more of the sources. For instance, the annotated scene 964 may include radio MAC information.

Figure 10:
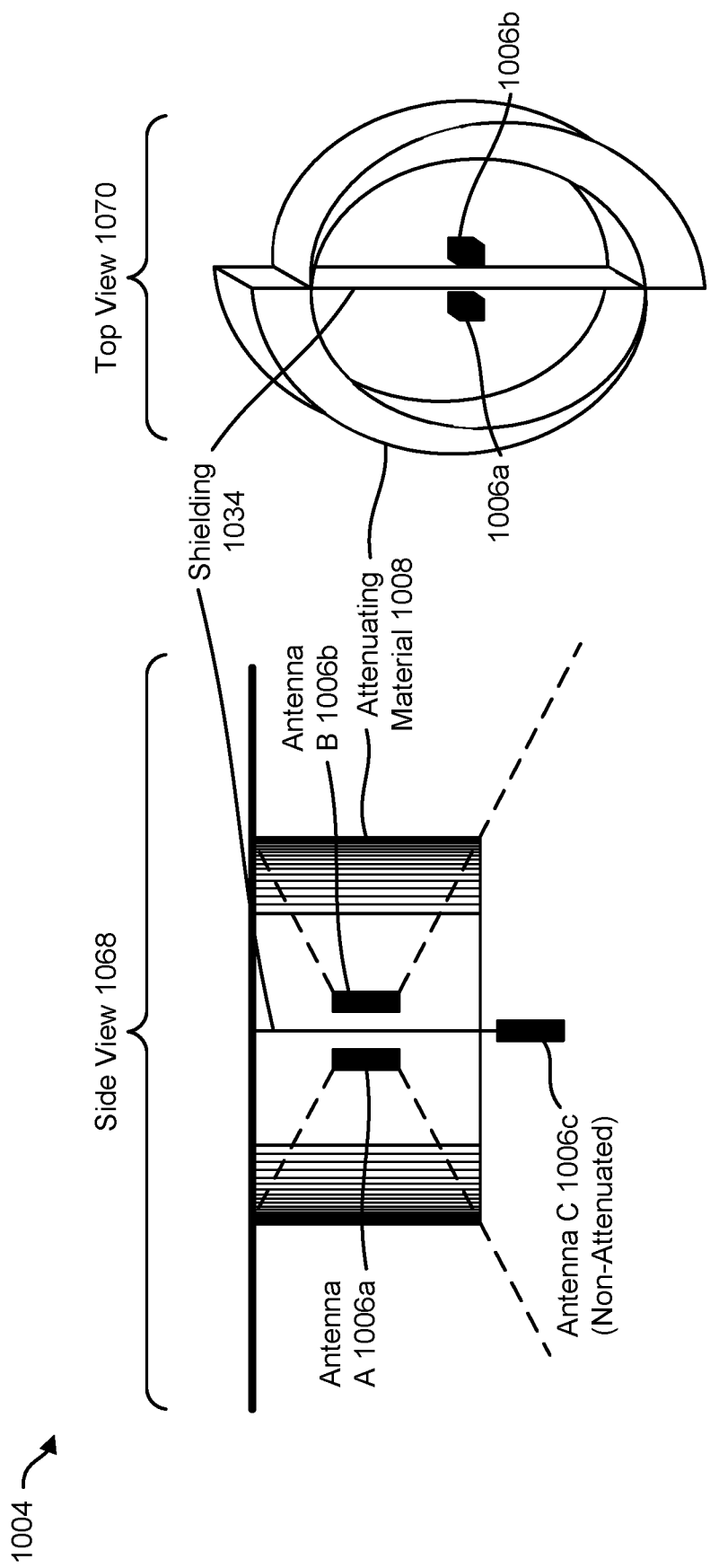
FIG. 10 is a diagram illustrating a side view and a top view of a vector detection device.

FIG. 10 is a diagram illustrating a side view 1068 and a top view 1070 of a vector detection device 1004. The vector detection device 1004 may be an example of the vector detection device 104 described in connection with FIG. 1. The vector detection device 1004 may be arranged in a round (e.g., circular) arrangement for 360-degree detection. As illustrated in FIG. 10, the vector detection device 1004 may include antenna A 1006a, antenna B 1006b, antenna C 1006c, attenuating material 1008, and/or shielding 1034 (e.g., RF shield). It should be noted that antenna C 1006c may be a single non-attenuated antenna that is located immediately below the two attenuated antennas in the vector detection device 1004. In some configurations, the vector detection device 1004 may provide 360-degree signal attenuation for a drone. For example, the vector detection device 1004 may be mounted on a drone.

Figure 11:
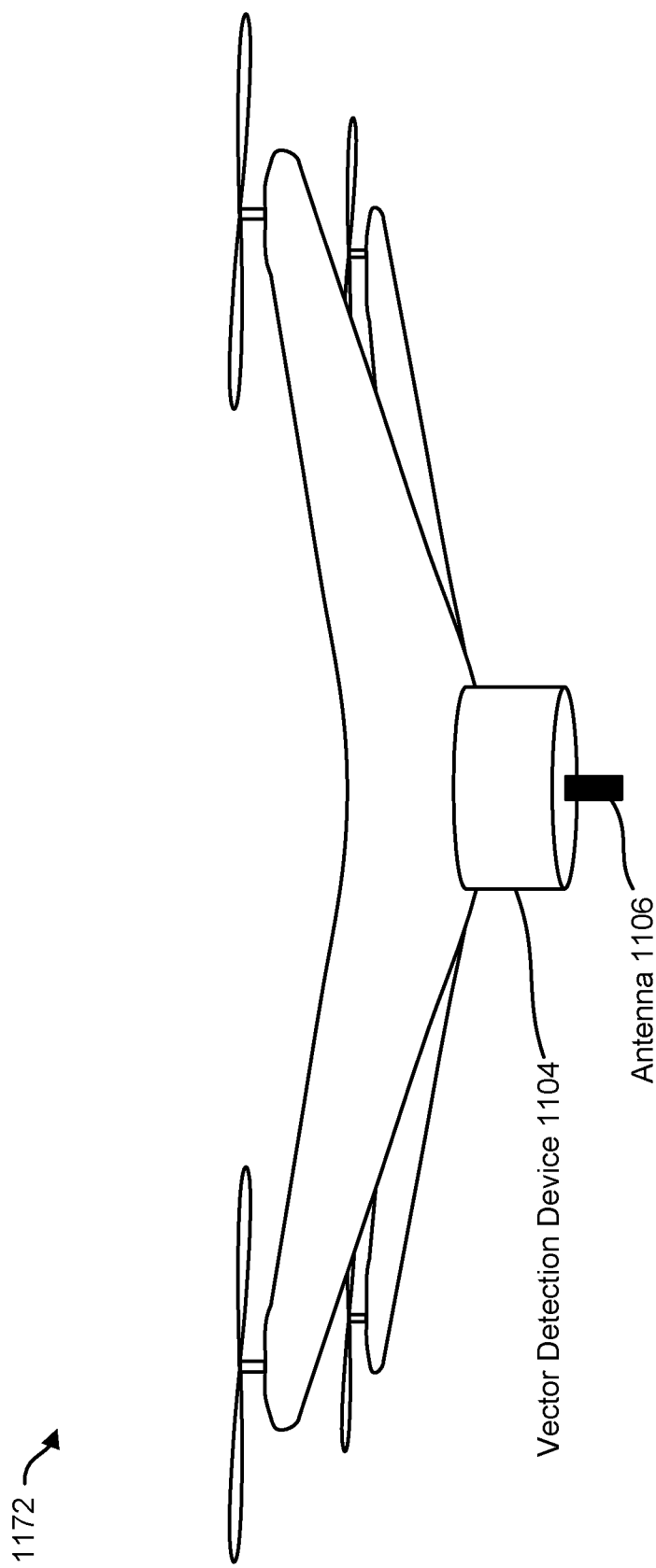
FIG. 11 is a diagram illustrating one configuration of a drone with a vector detection device.

FIG. 11 is a diagram illustrating one configuration of a drone 1172 with a vector detection device 1104. More specifically, FIG. 11 illustrates an example of a drone 1172 with a 360-degree vector detection device 1104. As illustrated in FIG. 11, a vector detection device 1104 may be included in the drone 1172 and/or may be attached to the drone 1172. The vector detection device 1104 may be an example of one or more of the vector detection devices 104, 1004 described herein. Additionally or alternatively, the drone 1172 may be an example of the apparatus 102 described in connection with FIG. 1. The vector detection device 1104 may include a non-attenuated antenna 1106 in some configurations.

Figure 12:
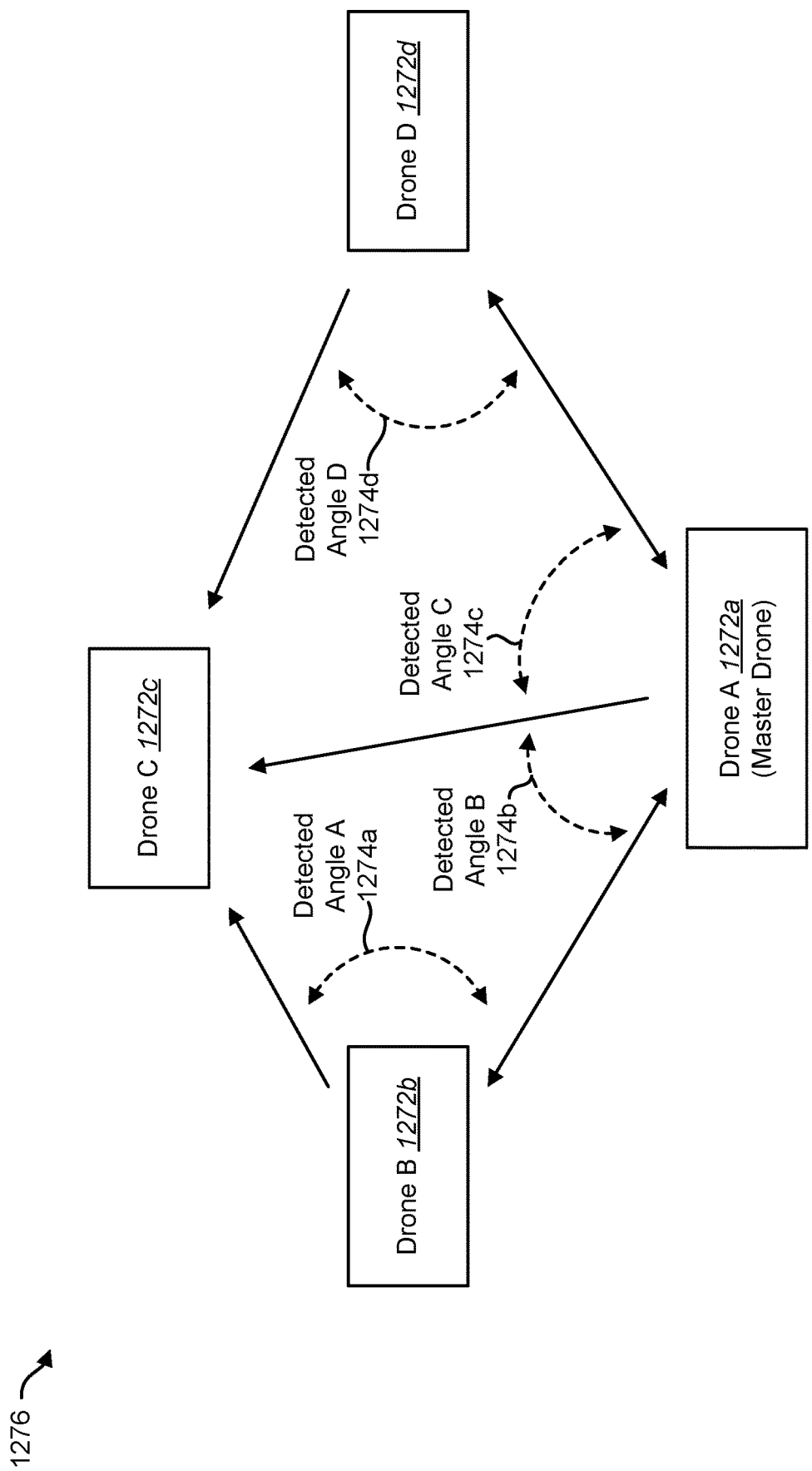
FIG. 12 is a diagram illustrated an example of a drone formation.

FIG. 12 is a diagram illustrated an example of a drone formation 1276. The drone formation 1276 may include drone A 1272a (e.g., a master drone), drone B 1272b, drone C 1272c, and drone D 1272d. One or more of the drones 1272a-d may be examples of the drone 1172 described in connection with FIG. 11. One or more of the drones 1272a-d may be examples of the apparatus 102 described in connection with FIG. 1. For example, one or more of the drones 1272a-d may include one or more vector detection devices. The one or more vector detection devices may be utilized to locate drones 1272a-d in the drone formation 1276. For example, drone B 1272b may determine detected angle A 1274a, drone A 1272a may determine detected angle B 1274b and detected angle C 1274c, and drone D 1272d may determine detected angle D 1274d. The detected angles 1274a-d may be utilized to form, maintain, and/or change the drone formation 1276. For example, drone A 1272a may determine a relative angle between drone A 1272a and drone B 1272b based on radio transmissions from drone B 1272b, as well as a relative angle between drone A 1272a and drone C 1272c based on radio transmissions from drone C 1272c. Based on the relative angles, drone A 1272a may determine detected angle B 1274b (by subtracting the relative angles, for example). Drone A 1272a may control its position and/or motion in order to maintain detected angle B 1274b and/or to change detected angle B 1274b.

It should be noted that the formation 1276 at a given set of angles alone may not govern the spacing between drones 1272a-d. Accordingly, an additional approach (e.g., method) for enforcing a distance between at least two drones 1272 may be implemented in some configurations. For example, spacing may be determined by GPS-based measurement between two drones 1272, by an ultrasonic-based measurement device, by a time of flight (TOF) camera, by stereoscopic image triangulation, etc. For instance, one or more of the drones 1272 may include a GPS device, an ultrasonic-based measurement device, TOF camera, one or more image sensors, etc., which may be utilized to determine and/or control distance(s) between drones 1272.

In some configurations, one or more drones (e.g., drones A-B and D 1272a-b, d) may be configured to perform interdiction of one or more other drones (e.g., drone C 1272c). For example, drones A, B, and D 1272a-b, d may be configured to determine a relative direction of drone C 1272c based on a radio transmission of drone C 1272c in accordance with the systems and methods disclosed herein. Drones A, B, and D 1272a-b, d may then maintain a formation 1276 relative to drone C 1272c in order to block drone C 1272c from moving in a particular direction and/or to a particular location.

Figure 13:
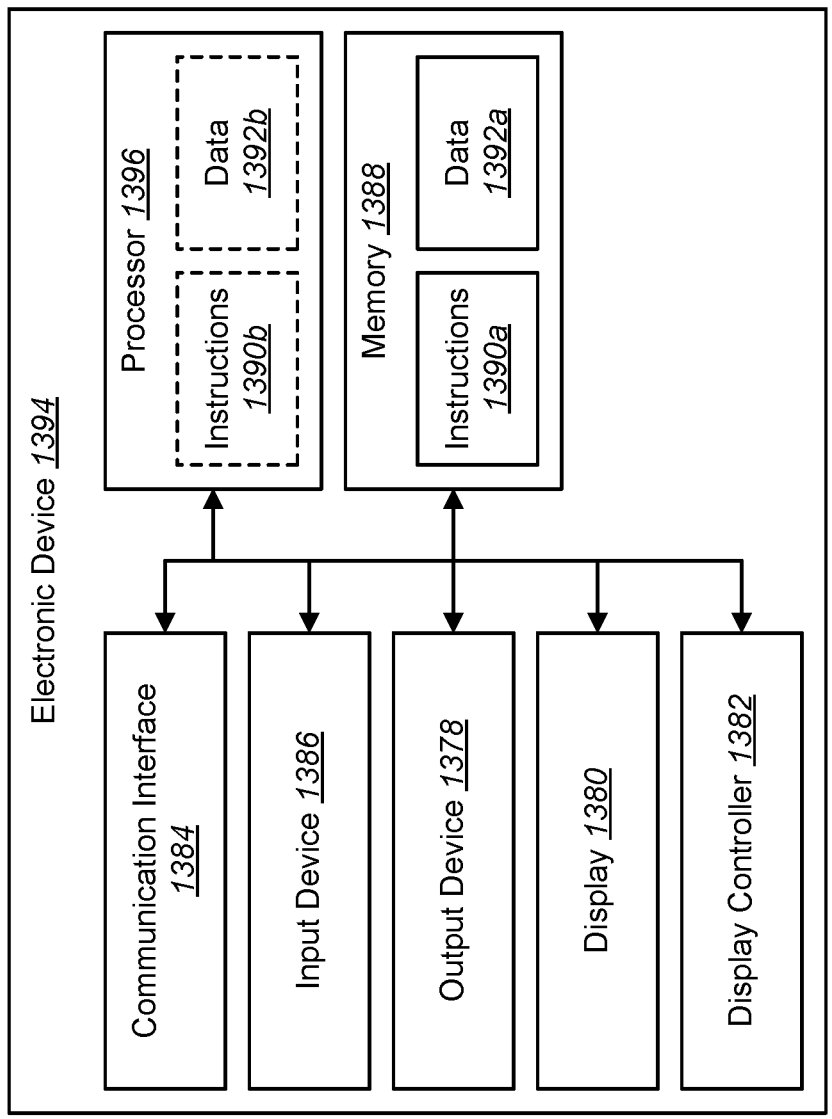
FIG. 13 illustrates various components that may be utilized in an electronic device.

FIG. 13 illustrates various components that may be utilized in an electronic device 1394. The electronic device 1394 may be configured in accordance with the apparatus 102 described in connection with FIG. 1. For example, the electronic device 1394 may be an example of the apparatus 102 described in connection with FIG. 1, the electronic device 1394 may be implemented as part of the apparatus 102, and/or the apparatus 102 may be implemented as part of the electronic device 1394.

The electronic device 1394 may include a processor 1396 and memory 1388. The memory 1388 may include instructions 1390a and data 1392a. The processor 1396 controls the operation of the electronic device 1394 and may be, for example, a microprocessor, a microcontroller, a digital signal processor (DSP) or other device known in the art. The processor 1396 typically performs logical and arithmetic operations based on program instructions 1390b and/or data 1392b received from the memory 1388.

The electronic device 1394 may include one or more communication interfaces 1384 for communicating with other electronic devices. The communication interfaces 1384 may be based on wired communication technology, wireless communication technology or both. Examples of different types of communication interfaces 1384 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The electronic device 1394 typically may include one or more input devices 1386 and one or more output devices 1378. Examples of different kinds of input devices 1386 include a keyboard, mouse, microphone, remote control device, button, joystick, trackball, touchpad, lightpen, etc. Examples of different kinds of output devices 1378 include a speaker, printer, etc. One specific type of output device 1378 that may be included in a computer system is a display device 1380. Display devices 1380 used with configurations disclosed herein may utilize any suitable image projection technology, such as liquid crystal display (LCD), light-emitting diode (LED), gas plasma, electroluminescence, a cathode ray tube (CRT) or the like.

A display controller 1382 may also be provided, for converting data 1392a stored in the memory 1388 into text, graphics and/or moving images (as appropriate) shown on the display device 1380. Of course, FIG. 13 illustrates only one possible configuration of an electronic device 1394. Various other architectures and components may be utilized.

In the above description, reference numbers have sometimes been used in connection with various terms. Where a term is used in connection with a reference number, this may refer to a specific element that is shown in one or more of the Figures. Where a term is used without a reference number, this may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An apparatus for indicating a direction of a radio signal, comprising:
    at least one vector detection device comprising two or more antennas and an attenuating material configured so that radio signals received by at least one of the antennas passes through the attenuating material, wherein the attenuating material is arranged to reduce a signal strength of received radio signals corresponding to an angle of a signal source with respect to the at least one of the antennas, and wherein the apparatus is configured annotate an image indicating at least an area or position of a detected signal source.

2. The apparatus of claim 1, wherein the at least one vector detection device comprises two vector detection devices.

3. The apparatus of claim 2, wherein the two vector detection devices are configured to generate signal strengths indicating orthogonal direction values relating to a location of the source in three-dimensional space.

4. The apparatus of claim 2, wherein the two vector detection devices comprise a first vector detection device configured to generate signal strengths indicating a horizontal angle value corresponding to a horizontal axis and a second vector detection device configured to generate signal strengths indicating a vertical angle value corresponding to a vertical axis.

5. The apparatus of claim 1, wherein the attenuating material comprises a first antenna attenuator and a second antenna attenuator arranged in an opposite direction from the first antenna attenuator.

6. The apparatus of claim 1, wherein the at least one vector detection device comprises a non-attenuated antenna, and wherein the apparatus is configured to compare an attenuated value and a non-attenuated value to generate a direction value.

7. The apparatus of claim 1, further comprising at least one of a differential amplifier or a processor configured to compare the received signal strengths from the two or more antennas.

8. The apparatus of claim 1, further comprising two or more radio frequency (RF) detectors, wherein each of the two or more RF detectors is respectively coupled to each of the two or more antennas, and wherein each of the two or more RF detectors is configured to generate one of the received signal strengths.

9. The apparatus of claim 1, wherein the apparatus is a drone.

10. A method for indicating a direction of a radio signal, comprising:
    receiving a radio signal by at least one vector detection device of an apparatus, wherein the at least one vector detection device comprises two or more antennas and an attenuating material configured so that radio signals received by at least one of the antennas passes through the attenuating material, wherein the attenuating material is arranged to reduce a signal strength of received radio signals corresponding to an angle of a signal source with respect to the at least one of the antennas;
    comparing, by the apparatus, received signal strengths from the two or more antennas;
    generating, by the apparatus, a signal indicating a direction of the radio signal based on comparing the received signal strengths; and
    annotating, by the apparatus, an image indicating at least an area or position of a detected signal source.

11. The method of claim 10, wherein the at least one vector detection device comprises two vector detection devices.

12. The method of claim 11, further comprising generating signal strengths indicating orthogonal direction values relating to a location of the source in three-dimensional space.

13. The method of claim 11, further comprising:
    generating, by a first vector detection device of the two vector detection devices, signal strengths indicating a horizontal angle value corresponding to a horizontal axis; and
    generating, by a second vector detection device of the two vector detection devices, signal strengths indicating a vertical angle value corresponding to a vertical axis.

14. The method of claim 10, wherein the attenuating material comprises a first antenna attenuator and a second antenna attenuator arranged in an opposite direction from the first antenna attenuator.

15. The method of claim 10, wherein the at least one vector detection device comprises a non-attenuated antenna, and wherein the method comprises comparing an attenuated value and a non-attenuated value to generate a direction value.

16. The method of claim 10, further comprising comparing, by at least one of a differential amplifier or a processor, the received signal strengths from the two or more antennas.

17. The method of claim 10, wherein the at least one vector detection device is attached to a drone.

18. A non-transitory tangible computer-readable medium for indicating a direction of a radio transmission, the computer-readable medium comprising executable instructions for:
    receiving a radio signal by at least one vector detection device, wherein the at least one vector detection device comprises two or more antennas and an attenuating material configured so that radio signals received by at least one of the antennas passes through the attenuating material, wherein the attenuating material is arranged to reduce a signal strength of received radio signals corresponding to an angle of a signal source with respect to the at least one of the antennas;
    comparing received signal strengths from the two or more antennas;
    generating a signal indicating a direction of the radio signal based on comparing the received signal strengths; and
    annotating an image indicating at least an area or position of a detected signal source.

* * * * *